United States Patent
Bowers

(10) Patent No.: US 7,941,300 B1
(45) Date of Patent: May 10, 2011

(54) PROCESS FOR THE DESIGN OF AN AIRFOIL

(75) Inventor: Martin Bowers, Victoria (CA)

(73) Assignee: Florida Turbine Technologies, Inc., Jupiter, FL (US)

(*) Notice: Subject to any disclaimer, the term of this patent is extended or adjusted under 35 U.S.C. 154(b) by 561 days.

(21) Appl. No.: 12/040,158

(22) Filed: Feb. 29, 2008

(51) Int. Cl.
*G06F 17/50* (2006.01)

(52) U.S. Cl. .................................... 703/1; 703/9

(58) Field of Classification Search .............. 703/1, 9; 702/42; 415/1, 115, 116, 199.5; 361/695
See application file for complete search history.

(56) References Cited

U.S. PATENT DOCUMENTS

| | | | |
|---|---|---|---|
| 6,464,462 B2* | 10/2002 | Stathopoulos et al. | 416/96 R |
| 6,554,562 B2* | 4/2003 | Dudebout et al. | 415/1 |
| 7,217,084 B2* | 5/2007 | Yu et al. | 415/55.1 |
| 2007/0177349 A1* | 8/2007 | Pokharna et al. | 361/696 |
| 2008/0286090 A1* | 11/2008 | Okita | 415/115 |
| 2009/0068003 A1* | 3/2009 | Sharma et al. | 415/199.5 |

OTHER PUBLICATIONS

Obayashi, S. Aerodynamic Optimization with Evolutionary Algorithms, UKACC International Conference on Control '96, 1996, pp. 687-692.*

* cited by examiner

*Primary Examiner* — Russell Frejd
(74) *Attorney, Agent, or Firm* — John Ryznic

(57) ABSTRACT

A process for designing an airfoil, such as a compressor blade or vane of a turbomachine, using a CFD or computational flow dynamics analysis. The process includes creating a solid model for use in the analysis, inputting the fluid inlet temperature, the momentum and the pressure to the airfoil, inputting the momentum of the airfoil wall, and setting the airfoil wall temperature to the value of the fluid inlet temperature in order to reduce the computational time. On convergence of the analysis, the efficiency of the airfoil and the pressure differential across the airfoil is determined and if it is not within an acceptable range, the solid model is modified in a attempt to improves this result and the modified solid model is re-analyzed using the same process until the airfoil efficiency and the pressure differential is within the acceptable range.

10 Claims, 2 Drawing Sheets

PROCESS FOR THE DESIGN OF AN AIRFOIL

FEDERAL RESEARCH STATEMENT

None.

CROSS-REFERENCE TO RELATED APPLICATIONS

None.

BACKGROUND OF THE MENTION

1. Field of the Invention

The present invention relates generally to an airfoil in a turbo machine, and more specifically to the process for designing an airfoil using computational fluid dynamics analysis.

2. Description of the Related Art Including Information Disclosed Under 37 CFR 1.97 and 1.98

A turbo machine includes one or more rows of airfoils, such as rotor blades and stator vanes that compress or expand a fluid due to the rotation of the airfoils. A compressor for an aero gas turbine engine includes several rows of rotor blades and stator vanes that progressively compress the air to high pressures. For example, the Pratt & Whitney JT8D turbofan engine used to power the Boeing 727 and 737 aircraft has a compressor with 11 stages with a compression ratio of 17 to 1.

The engine efficiency can be increased by improving the compression ratio of the compressor. The design process for the compressor includes complex computer analysis that includes a CFD (computational fluid dynamics) study of the airflow through the row or rows of vanes and blades. Through this CFD analysis, the design engineer can improve on the airfoil shapes so that the performance of the airfoils can be maximized.

In the prior art, the CFD analysis of a turbo machine blade row that is used in a turbo machine like a compressor and in which the blades are not cooled by passing cooling air through the interior of the airfoil, a number of variables are input to the analysis and a number of variables are output by the analysis. The properties of the fluid (such as air) is input variables and include the pressure P of the fluid, the momentum M of the fluid in each of the X, Y and Z axis, and the temperature T of the fluid that enters the airfoil. Also input variables include the momentum of the wall in each of the X, Y and Z axis. The back pressure P of the airfoil is also inputted into the analysis and is a constant with a predefined value. These are the input values for the analysis. The CFD analysis of the prior art is an adiabatic process since no heat transfer flows to or from the airfoil.

The output variables for the analysis include the wall Pressure and the wall Temperature, and the fluid momentum in the X, Y and Z axis, temperature of the fluid flow at the outlet of the airfoil, and the wall temperature. In this prior art CFD analysis, the wall Temperature is calculated in the analysis. Thus, the prior art analysis includes 9 inputs and 6 outputs that include the Wall Temperature of the airfoil. This analysis requires long periods of time to calculate, especially since the wall temperature of the airfoil is one of the 6 output variables that must be calculated in the CFD analysis. Convergence of CFD solutions consumes massive amounts of computational resources and designer time. Any method to reduce the time per simulation increases the number of simulations in a design cycle and leads to quicker and better designs of the turbo machine. In another prior art analysis, the wall temperature of the airfoil is guessed at and is therefore set before the CFD analysis is performed.

BRIEF SUMMARY OF THE INVENTION

It is an object of the present invention to provide for a more aerodynamically efficient airfoil.

It is another object of the present invention to provide for a CFD solution in an analysis of an airfoil to converge faster than the prior art analysis.

The present invention is a process for designing a turbine airfoil shape using a CFD analysis in which the wall temperature of the airfoil used in the analysis is given the value of the average total temperature of the inlet flow field. Instead of inputting the average flow field temperature and calculating the wall temperature in the analysis (which adds to the complexity and time to converge), the wall temperature is assigned the value of the fluid temperature at the inlet to the airfoils. The process of the present invention can be a non-adiabatic process in which heat transfer to or from the airfoil wall can occur. In the CFD analysis of the present invention, the number of input variables is 10 instead of 9 as in the prior art, and the number of output variables is 5 instead of 6 as in the prior art analysis. Thus, with one less output variable to calculate, the analysis time is shortened considerably. The CFD analysis process for the design of a turbo machine airfoil can be used for a stator vane or a rotor blade.

DETAILED DESCRIPTION OF THE INVENTION

The process of the present invention is an improved CFD analysis used for the design of a turbo machine airfoil such as a rotor blade or a stator vane in the turbo machine. The turbo machine can include one or more rows of blades and vanes. The process can be used to design each row of blades and vanes. Since each blade or vane in a row is the same shape and size, only a few of the airfoils need to be used in the computer model.

The CFD process includes 10 input variables and 5 output variables in which a convergence is desired. The design process for an airfoil typically will require several analyses each converging in which the subsequent analysis is improved based on the previous results in order to find a most desired result in the analysis.

The 10 input variables used in the analysis are the pressure P of the fluid at the inlet to the airfoil(s), the momentum of the fluid at the airfoil inlet in the X, Y and Z directions or axis, the temperature of the fluid at the airfoil inlet, the momentum of the airfoil wall in the X, Y and Z directions (axis), and the pressure of the fluid at the airfoil wall. The temperature of the airfoil wall is given the value of the average total temperature of the fluid at the airfoil inlet. The wall temperature can be assigned a value proportional to the inlet fluid temperature such as 95%. However, the preferred embodiment is to set the wall temperature to the average total temperature of the fluid at the airfoil inlet.

The 5 output variables of the analysis include the pressure at the airfoil wall, the temperature at the airfoil outlet, and the momentum in the X, Y and Z directions of the fluid at the airfoil outlet.

Figure 1:
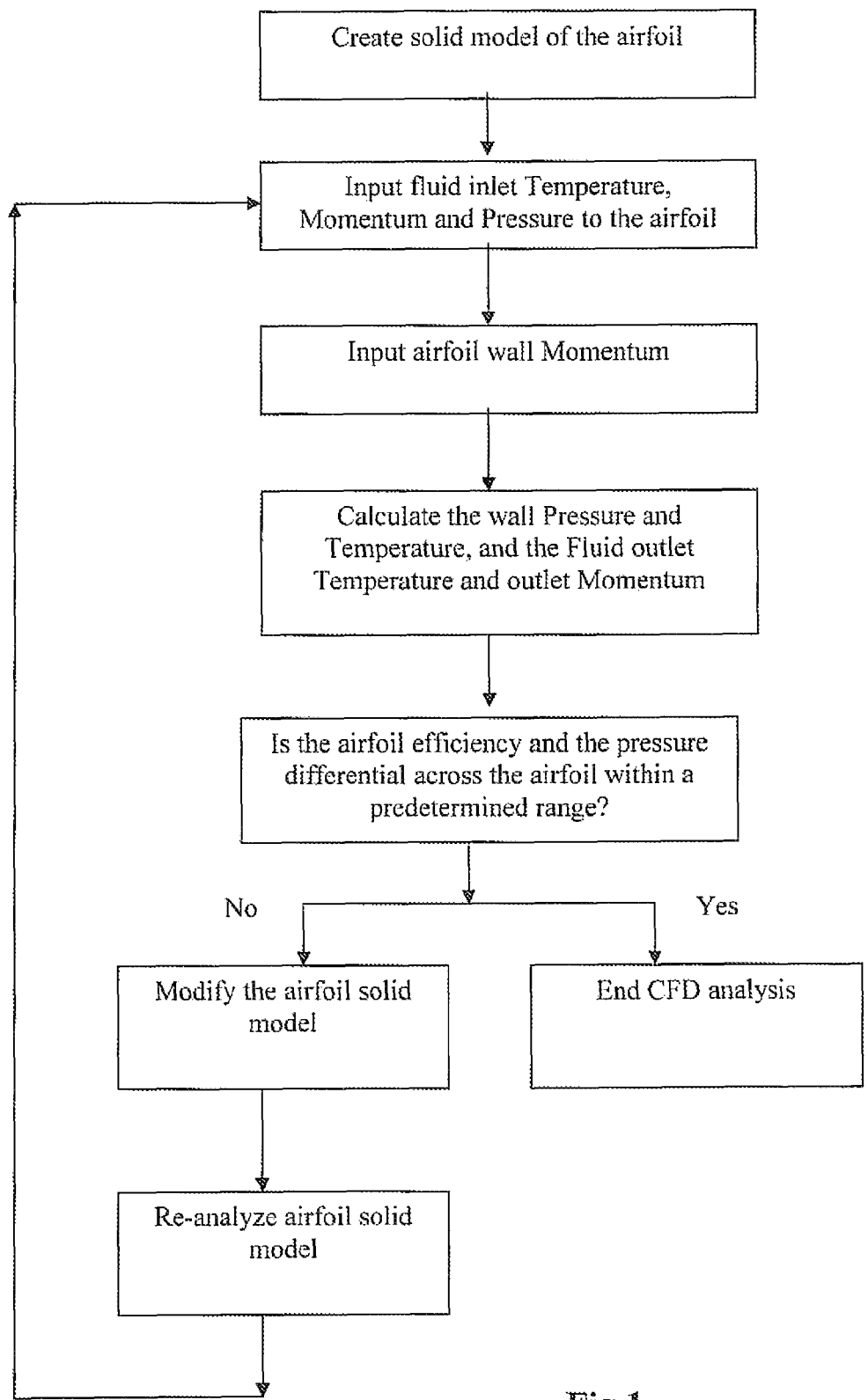
FIG. 1 shows the CFD analysis process for the design of an airfoil of the prior art.
Figure 2:
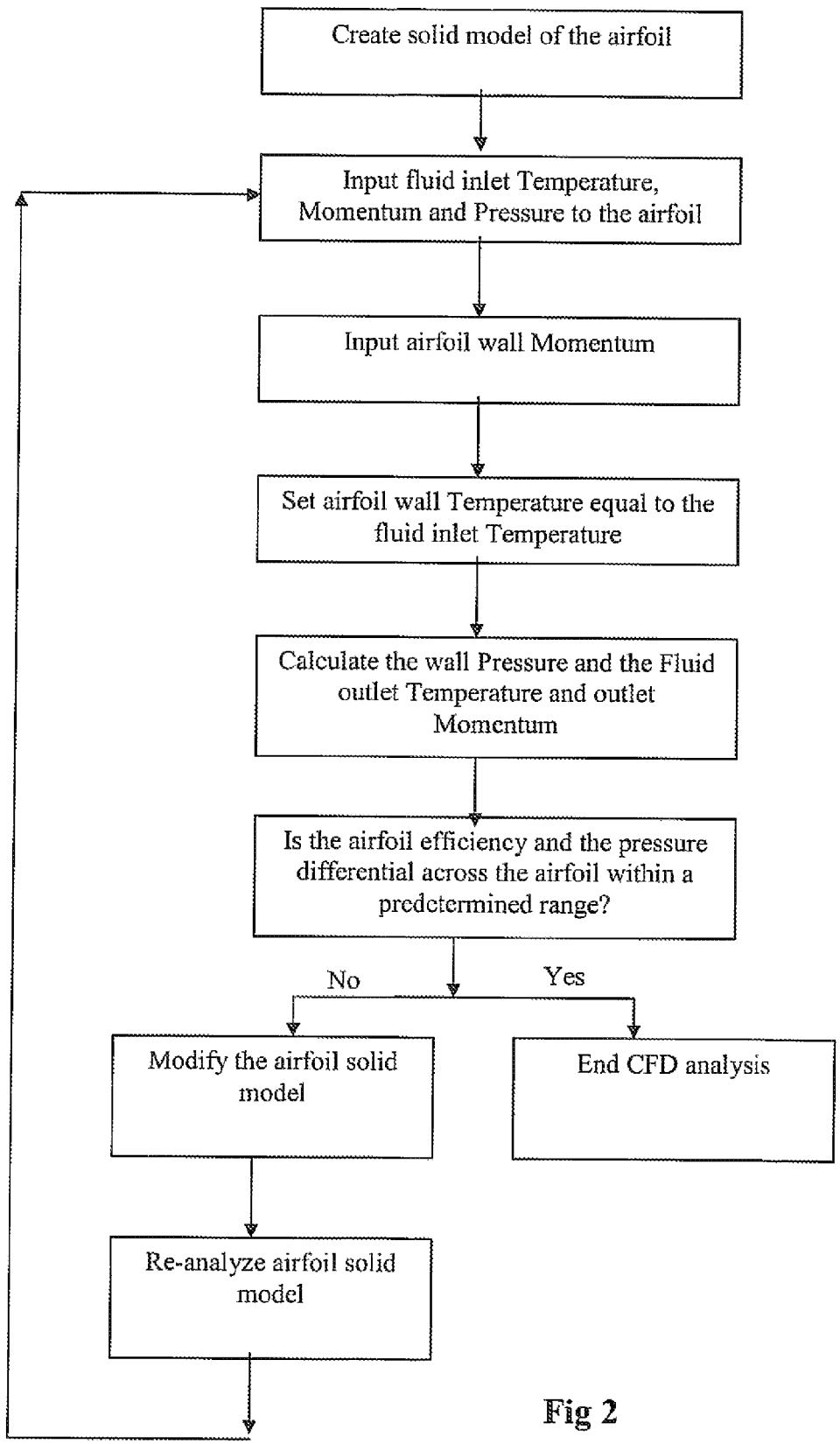
FIG. 2 shows the CFD analysis process for the design of an airfoil of the present invention.

The analysis using the 10 input variables is performed until the analysis converges. FIG. 2 shows the process steps for the CFD analysis of the present invention. In step 11, a solid model of an airfoil is used to start the analysis. Next, the temperature of the fluid inlet to the airfoil, and the momentum of the fluid at the airfoil inlet, and the pressure of the fluid at the airfoil inlet are entered into the analysis (step 12). Then, the momentum of the wall is input to the analysis and includes the momentum in the X, Y and Z directions (step 13). The temperature of the airfoil wall is then set to a proportion or equal to the temperature of the fluid at the inlet (step 14). The wall temperature can be exactly equal to the fluid inlet temperature or a proportion to it, such as 95% of the value. The back pressure of the fluid is set to a value (step 15). The CFD analysis then calculates the pressure of the airfoil wall and the fluid temperature and momentum at the airfoil outlet. The fluid outlet momentum is in the X, Y and Z directions (step 16). The analysis is performed until convergence occurs. Then, the results produce airfoil efficiency and a delta momentum across the airfoil. These results are compared. If the efficiency and the delta momentum are not acceptable, the solid model of the airfoil is modified such that a better efficiency and delta momentum can be obtained (step 17). Then, the CFD analysis is performed again using the same process steps described above but with the modified solid model of the airfoil (step 18), and another airfoil efficiency and delta momentum is calculated and compared again to see if further modification and analysis of the airfoil is needed (step 19). If the airfoil efficiency and delta pressure of the airfoil is within an acceptable limit, then the analysis is finished and the airfoil shape is finalized (step 20).

In summary, the results are used to modify the airfoil shape or size or any other design feature that will lead to an increase in performance of the airfoil. Additional analysis are performed each with a convergence until the designer is satisfied that the airfoil design will result in the desired performance. Because the temperature of the wall is not one of the variables that require calculation in the analysis, the time to convergence is decreased. As a result, the number of simulations in the airfoil design cycle is increased and therefore a better airfoil design can be accomplished. Upon each analysis, the designer can modify the solid model to improve the efficiency or the pressure different across of the airfoil. When the desired efficiency and pressure difference across the airfoil is found, then the analysis is completed.

The CFD analysis of the present invention can be used with any compressible aerodynamic CFD analysis process. In the present invention, a compressor blade for a multiple staged axial flow compressor used in an aero gas turbine engine was designed using the above described process. The airfoil shape was analyzed using the process in which the average inlet temperature of the air entering the blade was used also as the temperature of the wall of the airfoil. The CFD analysis was run until convergence, and then the airfoil shape was modified according to the results and the analysis and run again. The number of analysis' performed depends upon the final results of the last analysis. When an acceptable result is obtained for the airfoil shape, then the designer can accept the last analysis as the final design of the airfoil.

I claim the following:

1. A process for designing an airfoil using a CFD analysis comprising the steps of:
    forming a solid model of an airfoil;
    inputting into the CFD program the pressure, temperature and momentum of the fluid at an inlet to the airfoil;
    inputting into the CFD program the momentum of the wall of the airfoil;
    setting the airfoil wall temperature in the analysis to a specific temperature;
    generating an airfoil efficiency or a pressure change across the airfoil; and,
    determining if the airfoil efficiency and the pressure differential across the airfoil is acceptable.

2. The process for designing an airfoil of claim 1, and further comprising the step of:
    setting the airfoil wall temperature as the average total temperature of the inlet flow field for the airfoil.

3. The process for designing an airfoil of claim 2, and further comprising the step of:
    the step of inputting the fluid inlet momentum and the airfoil wall momentum includes inputting the momentum in the X, Y and Z directions.

4. The process for designing an airfoil of claim 3, and further comprising the step of:
    prior to the analysis, setting a back pressure for the fluid.

5. The process for designing an airfoil of claim 4, and further comprising the step of:
    if the airfoil efficiency and the pressure differential across the airfoil is not within an acceptable limit, then modifying the solid model in an attempt to improve the efficiency and the pressure delta and re-analyze the solid model by performing another CFD analysis using the modified solid model of the airfoil.

6. The process for designing an airfoil of claim 1, and further comprising the step of:
    the airfoil wall temperature is set to a proportional value of the fluid inlet temperature.

7. An airfoil for use in a turbo-machine where the airfoil is designed using the process of claim 1.

8. The airfoil of claim 7, and further comprising:
    the airfoil is a compressor rotor blade.

9. The airfoil of claim 7, and further comprising:
    the airfoil is a compressor stator vane.

10. The process for designing an airfoil of claim 1, and further comprising the step of:
    setting the airfoil wall temperature in the analysis as the inlet flow temperature of the fluid entering the airfoil.

* * * * *